United States Patent [19]

Hellwig et al.

[11] Patent Number: 4,589,340
[45] Date of Patent: May 20, 1986

[54] SENSOR CARRIER

[75] Inventors: Rolf Hellwig, Neuss; Jens Seidensticker, Kaarst; Klaus D. Karius, Duesseldorf, all of Fed. Rep. of Germany

[73] Assignee: Rheinmetall GmbH, Duesseldorf, Fed. Rep. of Germany

[21] Appl. No.: 573,343

[22] Filed: Jan. 24, 1984

[30] Foreign Application Priority Data

Feb. 7, 1983 [DE] Fed. Rep. of Germany ....... 3304070

[51] Int. Cl.[4] .................. F42B 23/24; F42C 19/00
[52] U.S. Cl. ............................. 102/293; 102/427
[58] Field of Search .............. 102/293, 427, 401

[56] References Cited

U.S. PATENT DOCUMENTS 3,754,508  8/1973  Dalton ................... 102/427
4,402,271  9/1983  Heidmann et al. ........ 102/401

FOREIGN PATENT DOCUMENTS 561665  5/1944  United Kingdom ........ 102/427

Primary Examiner—Charles T. Jordan

[57] ABSTRACT

The invention relates to a sensor-carrier which is transported by a useful load projectile to a predetermined target region which may be inaccessible and is set down in said region. For the purpose of avoiding damaging the sensitive sensor, the latter is, together with the sensor support, compactly mounted in a folded retracted condition in a rugged housing and is automatically projected out of the housing in an erected, extended position when the sensor-carrier is set down and the housing is opened. The sensor support consists of a plurality of rotationally symmetrical support members which are strung on a steel cable in a manner similar to a pearl necklace. The steel cable is surrounded by a sheathing and is connected via a disc to a coil spring for tensioning the steel cable. The sensor-carrier serves to position the sensor in an elevated position over the ground surface for improving its sensing and transmitting capabilities.

6 Claims, 3 Drawing Figures

SENSOR CARRIER

BACKGROUND OF THE INVENTION

The invention relates to a sensor carrier for military applications.

In military applications (but not exclusively in this field) there frequently exists a need to provide a sensor in an inaccessible region for the purpose of measuring physical magnitudes, such as for example, sound, temperature, moisture, or gas concentration, and to transmit the measured values by wireless transmission means, for example by radio, to a central processing unit.

One possible way to transport such a sensor is by using a useful load carrying projectile which is fired from a gun barrel weapon or transported by means of a rocket motor and which distributes a plurality of sensors over a target region by dropping them, for example, by parachute on the target region.

The sensors and the electronic components which are connected to the sensors, which components process the parameters which have been received by the sensors and which transmit these parameters as radio signals, must withstand by means of a compact housing the strong shock loads which occur during firing and impacting. Such housing must carefully protect the sensor and its electronic components. For purposes of transporting a plurality of sensors in a single useful load projectile these packaged units must be compactly constructed. On the other hand the requirement exists that the sensors, for the purpose of enlarging their sensing range, are positioned after being set down on the ground as high as possible over the ground surface, so that their functioning is not inhibited by obstacles, such as, for example, rocks, bushes or in particular high grass.

SUMMARY OF THE INVENTION

It is an object of this invention to provide a sensor carrier which, on the one hand, securely protects the sensor and electronic components during firing and during the dropping process and, on the other hand, after the sensor has been set down is capable of functioning without being inhibited by obstacles.

DESCRIPTION OF THE DRAWINGS

With this and other objects in view, which will become apparent in the following detailed description, the present invention will be clearly understood in connection with the accompanying drawings, in which.

DETAILED DESCRIPTION

Figure 1:
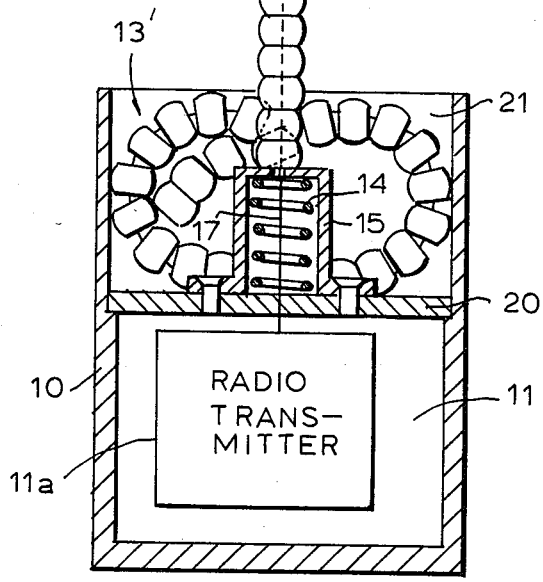
FIG. 1 is a side elevational view, partially in section, of the sensor-carrier of the invention having an extended sensor and which also includes a schematic illustration of the sensor when it is in a packaged and retracted condition.

FIG. 1 illustrates schematically, partially in section, in side elevation, a sensor-carrier having a sensor in an extended operative position and also illustrates additionally schematically the same sensor in a packaged or inoperative position. The sensor-carrier includes a housing 10, in the lower region of which the required electronic components for operating the sensor are mounted and also, if need be, the energy supply source is mounted therein. An intermediate wall 20 separates the electronic component storage chamber 11 from the packaging chamber 21. The sensor 21 and sensor mounting means 13 are mounted, when in their inoperative position, that is during their traverse along the transport path, in particular during firing and setting down, in the illustrated retracted packaged condition. The reference number 13' indicates the sensor mounting means as packaged in a compact space. During the transporting the packaging chamber 21 is closed by a cover, which has not been illustrated in FIG. 1 for purpose of clarity, for the purpose of protecting the sensor 12 and the retracted sensor mounting means 13. After termination of the setting-down process the cover can be blown off by known means, for example, by means of a pyrotechnical charge or by means of a mechanical spring, in order to permit the unfolding and extending of the sensor mounting means 13 for the purpose of positioning the sensor 12 into an operative position, so that the sensor 12 can "see" over obstacles, as, for example, rocks, bushes or grass at the location at which the sensor-carrier has been set down so that it can operate without disturbances. If the sensor 12 is set down in an elevated region it has the additional advantage of being capable of surveiling a larger region.

Figure 3:
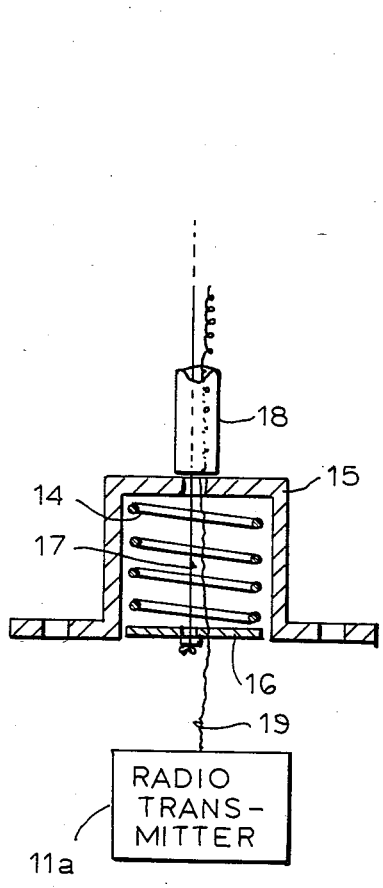
FIG. 3 is a detailed cross-sectional view in an enlarged scale of a part of the arrangement of FIG. 1.
Figure 2:
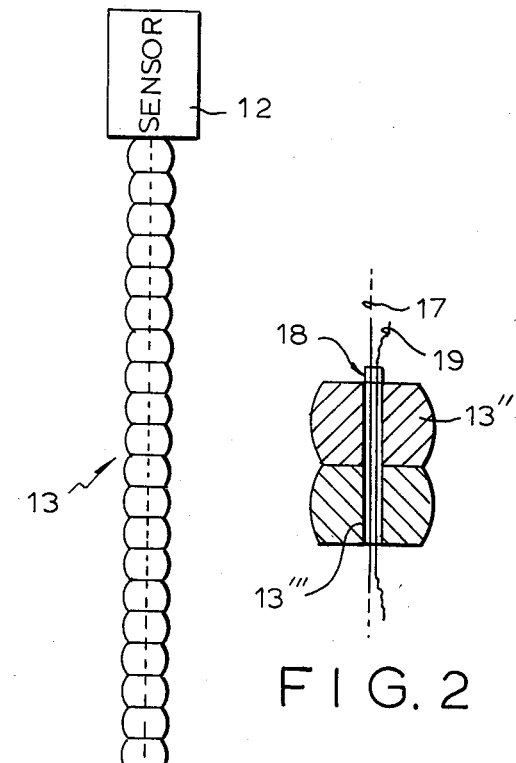
FIG. 2 is a cross-sectional view of a partial region of the sensor-carrier illustrating two support bodies in an enlarged scale.

The sensor mounting means 13 consists of a plurality of rotational symmetrical shaped adjoining support bodies 13" (FIG. 2) which abut against each other via flat end face surfaces when the sensor 12 is in an operative position (FIG. 1). Each one of the adjoining abutting support bodies 13" are provided with a central bore through which a flexible support means extends in a manner similar to a pearl necklace. The support means can take the form of a steel cable 17 which is provided with a sheathing 18. The sheathing 18 is loosely arranged between the sensor body 12 proper and a hat-shaped housing 15 (FIG. 3) which extends into the interior of the packaging chamber 21 and is mounted by means of two threaded bolts onto the intermediate wall 20. The steel cable 17 is fixedly secured to a disc 16 at one of its two ends. The disc 16 is biased by means of a coil spring 14 arranged inside of the hat-shaped housing 15. When the sensor 12 is in an erect extended condition the coil spring 14 biases the steel cable 17 in such a way that the support bodies 13" mounted one on top of the next adjoining one along the sheathing 18, are pressed together between the sensor body 12 and the top surface of the hat-shaped housing 15 and thereby provide a sufficiently stable erect support structure for the sensor body 12 which support structure is also flexible. When applying a sufficiently large force, the biasing force of the coil spring 14 is overcome and the sensor mounting means 13 can be folded, as is illustrated schematically in FIG. 1, into a compact space in the packaging chamber 21.

This facilitates, as has been described hereinabove, the secure transporting of the sensor 23 to a practical destination. During the transporting the non-illustrated cover secures the packaging chamber 21 and prevents the sensor mounting means 13 to unfold.

By means of the centrally axially arranged bores 13''' on each support body 13" it is possible to thread an additional flexible cable 19 therethrough, which flexible cable 19 connects the sensor 12 with the electronic components mounted in the electronic components storage chamber 11. This electrical cable 19 transmits the electrical signals which are generated by the sensor 12 as a result of the sensed measured magnitudes for further processing in the electronic components.

The sensed data received by the sensor 12 which is conducted in the form of electronic signals to the electronic components disposed in the storage space 11 are transmitted by each set down sensor 12 via radio signals to a central unit for further processing. As is known, the transmitting range of such a radio transmitter 11a mounted in the sensor-carrier depends from an optimum antenna arrangement, which means a favorable height above ground. In order to improve the radio transmission, either the cable 17 and/or a sheathing 18 of the sensor mounting means 13, which form a metal coil, can be used as an antenna for the radio transmitter of the sensor-carrier.

Although a limited number of embodiments of the invention have been illustrated in the accompanying drawings and described in the foregoing specification, it is to be especially understood that various changes, such as in the relative dimensions of the parts, materials used, and the like, as well as the suggested manner of the use of the apparatus of the invention, may be made therein without departing from the spirit and scope of the invention, as will now be apparent to those skilled in the art.

We claim:

1. A sensor-carrier for a useful load projectile which is adapted to transport and set down a sensor in a predetermined target region, comprising a first housing having at least two separate chambers;

sensor mounting means operatively mounted in said first housing; and a sensor operatively connected to said sensor mounting means, said sensor mounting means are flexible and compactly foldable into a relatively small space inside said first housing when in an inoperative retracted position, and said flexible sensor mounting means automatically unfold and extend outside said first housing when said sensor mounting means are in an operative extended position, whereby after said first housing is opened said sensor mounting means automatically extending said sensor outside said first housing by moving from said inoperative retracted position into said operative extended position, said sensor mounting means include a plurality of rotationally symmetrically shaped support bodies, each support body has a central axial through-bore, a steel cable extending through the through-bores of the support bodies so as to form a string of support bodies similar to a string of pearls of a pearl necklace, each support body has a pair of opposite flat end faces, adjoining end faces of adjoining support bodies being in abutting contact with each other when said flexible sensor mounting means are in the operative, unfolded, extended and erect position.

2. The sensor-carrier as set forth in claim 1, wherein said sensor is mounted in a second housing, said first housing having a wall which separates said first housing into a first chamber for receiving electronic means and a second chamber in which said flexible sensor mounting means are stored when in their inoperative position; an inverted pot-shaped member being fixedly connected to said wall; a sheathing surrounding said steel cable; said steel cable being operatively secured at one of its ends to said second housing and at its other end to said pot-shaped member.

3. The sensor-carrier as set forth in claim 2, including a coil spring operatively mounted in said pot-shaped member, a disc coaxially mounted with respect to said coil-spring inside said pot-shaped member and being connected to said other end of said steel cable; said coil spring tensioning said steel cable via said disc so as to urge said string of support bodies into an erect extended position when said first housing is open.

4. The sensor-carrier as set forth in claim 3, wherein said wall divides said housing into an upper chamber for storing said sensor mounting means and a lower chamber for storing electronic components.

5. The sensor-carrier as set forth in claim 4, including electrical connecting wire means co-extending along said steel cable from said sensor to said electronic components.

6. The sensor-carrier as set forth in claim 5, wherein said electronic components include a radio transmitter for sending radio signals in accordance with the data sensed by said sensor, and said steel cable and/or sheathing functioning as an antenna for said radio transmitter.

* * * * *